United States Patent
Maniyar

(10) Patent No.: US 11,783,393 B2
(45) Date of Patent: *Oct. 10, 2023

(54) OPTIMIZATION OF DATA QUEUE PRIORITY FOR REDUCING NETWORK DATA LOAD SPEEDS

(71) Applicant: PAYPAL, INC., San Jose, CA (US)

(72) Inventor: Vidit Nayankumar Maniyar, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/490,402

(22) Filed: Sep. 30, 2021

(65) Prior Publication Data

US 2022/0020070 A1    Jan. 20, 2022

Related U.S. Application Data

(63) Continuation of application No. 16/023,758, filed on Jun. 29, 2018, now Pat. No. 11,144,973.

(51) Int. Cl.
*G06Q 30/00* (2023.01)
*G06Q 30/0601* (2023.01)
(Continued)

(52) U.S. Cl.
CPC ..... *G06Q 30/0601* (2013.01); *H04L 47/6215* (2013.01); *H04L 49/90* (2013.01); *H04L 67/306* (2013.01)

(58) Field of Classification Search
CPC . G06Q 30/0601; H04L 47/6215; H04L 49/90; H04L 67/306
See application file for complete search history.

(56) References Cited

U.S. PATENT DOCUMENTS 7,624,047 B1   11/2009   Round
7,693,991 B2   4/2010    Greenlee et al.
(Continued)

OTHER PUBLICATIONS

"A Priority-Based Admission Control Scheme for Commercial Web Servers," by Ibtehal Nafea, Muhammad Younas, Robert Holton, and Irfan Awan, International Journal of Parallel Programming 42.5: 776-797. Springer Nature B.V. (Oct. 2014) (Year: 2014).*

(Continued)

*Primary Examiner* — Anne M Georgalas
(74) *Attorney, Agent, or Firm* — Haynes and Boone, LLP

(57) ABSTRACT

There are provided systems and methods for optimization of data queue priority for reducing network data load speeds. A user may utilize a communication device to access an online resource and request data, such as server data from an online server. The online resource may determine a user profile associated with the user and/or device, which may include previous online actions and completion information for electronic transaction processing with one or more online entities. Using the profile, the server may optimize a data queue for data delivery to multiple devices depending on the devices' data requests and priority. The server may deliver data to the devices based on the data queue. The server may also update the user profile based on additional device actions with the server. These techniques may be particularly useful for prioritizing requests during peak server resource usage.

20 Claims, 6 Drawing Sheets

(51) Int. Cl.
*H04L 47/62* (2022.01)
*H04L 49/90* (2022.01)
*H04L 67/306* (2022.01)

(56) References Cited

U.S. PATENT DOCUMENTS

| | | | |
|---|---|---|---|
| 7,747,493 B1* | 6/2010 | Monroe | G06Q 40/04 |
| | | | 705/36 R |
| 8,078,483 B1* | 12/2011 | Hirose | G06Q 10/02 |
| | | | 705/5 |
| 8,813,090 B2* | 8/2014 | Jamjoom | G06F 9/50 |
| | | | 709/224 |
| 8,850,022 B2 | 9/2014 | Hoffmann | |
| 8,972,326 B2* | 3/2015 | Prathaban | H04L 67/1001 |
| | | | 706/917 |
| 10,181,103 B2* | 1/2019 | Bramnick | G06Q 10/02 |
| 10,237,311 B2* | 3/2019 | Dange | H04L 65/1069 |
| 10,333,863 B2* | 6/2019 | Klots | H04L 47/822 |
| 10,592,930 B2 | 3/2020 | Ramer et al. | |
| 2002/0099831 A1* | 7/2002 | Tsunogai | H04L 67/14 |
| | | | 709/227 |
| 2004/0003029 A1 | 1/2004 | Islam et al. | |
| 2004/0044566 A1 | 3/2004 | Bostelmann et al. | |
| 2005/0089053 A1* | 4/2005 | Zhu | H04M 3/5191 |
| | | | 370/420 |
| 2007/0118653 A1 | 5/2007 | Bindal | |
| 2007/0143290 A1 | 6/2007 | Fujimoto et al. | |
| 2007/0233291 A1* | 10/2007 | Herde | G06Q 10/10 |
| | | | 700/91 |
| 2008/0195824 A1 | 8/2008 | Sadovsky et al. | |
| 2009/0037361 A1 | 2/2009 | Prathaban et al. | |
| 2009/0327079 A1 | 12/2009 | Parker et al. | |
| 2010/0204989 A1 | 8/2010 | Boes et al. | |
| 2012/0296682 A1 | 11/2012 | Kumar et al. | |
| 2014/0211698 A1 | 7/2014 | Aguirre et al. | |
| 2014/0344275 A1 | 11/2014 | Matsuda et al. | |
| 2016/0117726 A1 | 4/2016 | Lee | |
| 2016/0373377 A1 | 12/2016 | Cao et al. | |

OTHER PUBLICATIONS

"A Personalized System for Scalable Distribution of Multimedia Content in Multicast Wireless Networks" by Ismael de Fez, Miriam Gil, Joan Fons, Juan Carlos Guerri, and Vincente Pelechano, Multimedia Tools and Applications 74.21: 9595-9621, Springer Nature B.V. (Nov. 2015) (Year: 2015).

* cited by examiner

OPTIMIZATION OF DATA QUEUE PRIORITY FOR REDUCING NETWORK DATA LOAD SPEEDS

CROSS REFERENCE TO RELATED APPLICATIONS

This application is a Continuation of U.S. patent application Ser. No. 16/023,758, filed Jun. 29, 2018, which is incorporated by reference in its entirety.

TECHNICAL FIELD

The present application generally relates to online resource usage optimization and network data load speed reduction, and more specifically to optimizing a server's data queue priority based on profiles associated with devices requesting server data, according to various embodiments.

BACKGROUND

Devices may be utilized to perform actions over a network, including accessing online resources provided by other devices and/or servers and requesting data. Generally, data may be provided over a network based on network bandwidth constrictions, device service levels or tiers on the network, and processing speed or availability for the device/server handling the online resource. However, during times of high network load and/or online resource usage, data load speeds may be drastically reduced due to demand from multiple devices. In times where a server receives a high number of data requests, determining how to allocate server resources in order to service the requests can be a challenging task.

Figure 1:
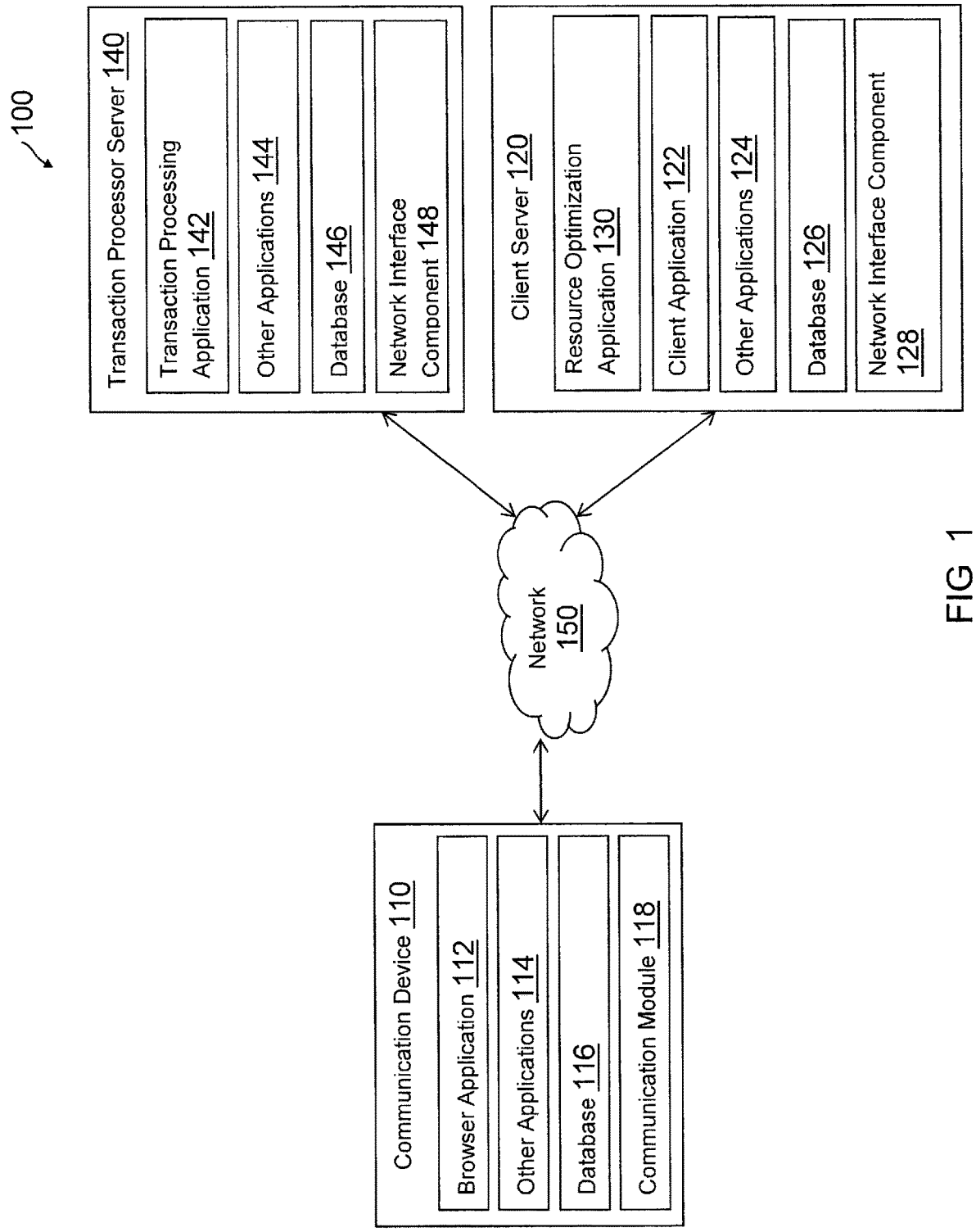
FIG. 1 is a block diagram of a networked system suitable for implementing the processes described herein, according to an embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods utilized for optimization of data queue priority for reducing network data load speeds, according to various embodiments. Systems suitable for practicing methods of the present disclosure are also provided.

An online resource may provide profile determination and monitoring to optimize a data queue used for data delivery to devices based on profile actions with the online resource and/or across other online resources, such as websites and/or online platforms accessible through a dedicated application for the platform. An online resource may correspond to a website accessed by device, which may provide various website resources, online interactions, and data processing. More generally, an online resource may also correspond to a device, server, or database accessible over a network, such as the Internet, which may provide data for output in an application (e.g., a dedicated application of a service provider). The profile may correspond to data requests by the device or user from the online resource, such as a request for website data and/or data processing. In certain aspects, the profile may be associated with electronic transaction processing completion and/or abandonment rates with the online resource and/or with other online resources, such as a number of completed and/or abandoned transactions and/or ratios of such transactions. The profile may also include how much server resources are consumed by the user or profile when accessing the online resource(s), which may be lifetime, per visit, or otherwise measured. The profile may be determined by the online resource when the device accesses the online resource and submits a data request, or may be retrieved and/or updated based on a previously generated profile. The profile may also or instead be determined based on the value of the current digital shopping cart and/or incoming transaction. For example, the profile may be based on a monetary total of the presently available and processing digital shopping cart and may be compared to other digital shopping carts concurrently being processed (e.g., $500 vs. $5,000 value for different digital shopping carts).

After determining the profile, the online resource may determine a priority of the device within a data queue and/or for use of server processing and data delivery resources of the online resource. For example, the profile may indicate that the particular device is associated with a high value user or device that would benefit from faster data processing and delivery speeds. Conversely, if the profile indicates that it is not as consequential for the device to receive lower data loading times, the online resource may adjust server resources accordingly to perform load balancing. The device's placement in a data queue for data processing and/or delivery may be adjusted based on the profile. The online resource may also prioritize use of the online resource's computing power, data delivery bandwidth, and/or processing order based on the profile. Thus, the online resource may reduce data processing and delivery times over a network by performing load balancing based on the profile.

In order to perform load balancing of server resources based on a profile, the online resource, such as a webpage or other accessible online resource by a device, may first receive a data request from a device. The device may correspond to a computing device, such as a personal or tablet computer or mobile smart phone. The data request may also be generated by smart home devices (e.g., smart home microphone/speakers that capture a voice data input associated with ordering an item) and/or Internet of Things (IoT) connected devices (e.g., sensors and token devices that automatically order or re-order items in a home). The data request may be generated and transmitted to the online resource using an application on the device, which may correspond to a web browser application or a dedicated application of a service provider and/or merchant. For example, a dedicated application may allow the device to access a server and request data and data processing for delivery within a particular application provided by a service provider or merchant. The online resource may correspond to a website or other online platform that provides a digital marketplace where one or more users may view items for purchase, add the items to a digital shopping cart, and perform checkout and electronic transaction processing to purchase the items. Thus, the data request may correspond to item data for viewing on the user's device, as well as shopping session data processing (e.g., adding items to a digital shopping cart) and processing the digital shopping cart using an online transaction processor. The data request may also be generated by a companion application of a smart device or IoT connected device.

However, more generally, the online resource may correspond to any accessible online device/server that provides data and data processing to devices. For example, users may utilize online platforms, resources, and/or services to request data, provide. For example, a social networking platform (e.g., FACEBOOK®) may provide a user with an account where the user may share media and post text and/or digital content (e.g., images, videos, emojis or other visual icons, etc.). In other embodiments, the users may utilize different types of online services to share information and/or perform messaging, including media sharing services (e.g., for sharing of images and/or videos, such as YOUTUBE®, INSTAGRAM®, or IMGUR®), a microblogging service (e.g., for sharing of small text blog posts and/or images/videos, such as TWITTER®), or other online service. The users may therefore request and/or transmit data using the online services.

After receiving the data request, the online resource may access a profile associated with the device. The profile may correspond to a digital usage history that includes previous actions taken with the online resource and/or other online resources. In certain aspects, the profile may be device-based, such as particular online actions performed or executed by the device. However, the profile may also be user-based and tracked across multiple devices, for example, through identifying the user on each device through an account login, user authentication, and/or user identification on each device. The profile may include actions, data requests, transaction processing, and other online events performed by the user/device. The profile may be specific to the particular online resource, but may also be tracked across multiple online resources and may include profile data for the user/device with other online resources in addition to the online resource receiving the data request.

In certain aspects, the user profile may correspond to an amount of time the user/device spends on the website or with the online resource and/or other online resources, as well as an amount of data requested during each use or session with the online resource (e.g., past use session information for the user/profile with the online resource). The profile may also include a number of logins to an account with the online resource and/or other online resources, and actions taken by the user/device during the logins. The profile may therefore include information associated with use of the account, for example, based on electronic transaction processing results using the account with the online resource and/or other resources. This may be compared with the amount of data requested by the device and how much server resources the user/device consumes per visit (e.g., the amount of consumed or used data processing capabilities or data transfer bandwidth, which may be tied to available and utilized hardware and software components of a server, such as central processing unit, memory, bandwidth, or other computing resource). The profile may include data that is used to determine a lifetime or other time period value of the user/device with the online resource(s). The profile may be monitored by a browser or other application on the user's device, a service provider, or a merchant providing the online resource. Thus, the profile may be generated by the user's device (e.g., using on-device data, cookies, browsing history, etc.) or by an online entity (e.g., based on received online actions by the user/device). In various embodiments, a profile may therefore be based on a user account, but can also be based on fingerprinting a device (e.g. by assessing various characteristics of the device and/or its network connection, including IP address, system CPU(s), amount of available physical and/or virtual memory, display size, display type, I/O devices of the device, operating system version number, etc.—or other information suitable to form what is believed to be uniquely identifying information within a high degree of confidence.)

In certain embodiments, a user profile may correspond to or include an account history with a service provider, where the account history may include electronic transaction processing results. The account history may further track electronic transaction processing successes and/or abandonment rates, such as successful checkout and processing for items in a digital shopping cart and/or abandonment of digital shopping carts or shopping sessions on an online merchant platform or marketplace. The online service provider may provide account services to users of the online service provider, as well as other entities requesting additional services, which may be used to process electronic transactions. Once an account is created, the account may be accessed through a web browser from a website of the service provider and/or a dedicated application of the service provider or a merchant, such as a mobile smart phone application. A token may be issued to the device of the user for their account, where the token may include data (which may be encrypted) allowing the service provider to identify the user and their account and authenticate the user. The token may be used to track the account and therefore user profile across multiple websites and other online resources. Additionally, the online service provider or other service provider may provide digital wallet services, which may offer financial services to send, store, and receive money, process financial instruments, and/or provide transaction histories.

The service provider, such as an entity utilizing a transaction or payment processor, may provide a payment platform that enables a user to provide payments to a merchant as well as engage in user-to-user (or peer-to-peer (P2P)) payments and transfers through electronic transaction processing using the payment platform. In this regard, the computing device of the user may include a payment and/or transaction processing application, which may be configured to send and receive payments with other entities, such as another user and/or a merchant. The application may be associated with an electronic transaction service provider, such as PayPal® or other online payment service, which may provide payments and other services on behalf of users. The electronic transaction service provider may provide payment accounts and digital wallet services that enable the accounts to send, store, and receive money, process financial instruments, and/or provide transaction histories. The electronic transaction service provider may offer further services to users, such as extension of credit, credit history review, account establishment and maintenance, and other financial and personal services.

Merchants may similarly use service providers, including the transaction service provider, to receive payments from users. Merchants (e.g., a seller or payment receiver, such as a business, fundraiser, healthcare provider, landlord, etc.) may correspond to any person or entity selling goods and/or services (referred to herein as an "item" or "items") to other users/entities, such as buyers (e.g., a payer or payment sender, including a customer, donator, patient, renter, or other party). The user may utilize an application on the device to perform one or more processes and features for use of the financial services provided through the online transaction processor, including payment for a transaction with a merchant. Thus, the account history used to determine the profile may include transaction histories with merchants, including the amount for the transactions, number of transactions, and success rate on converting items selected for purchase in a digital shopping cart to completion of the transaction. For example, the account history may further track when the user adds items to a digital shopping cart but does not complete a transaction to purchase the items and abandons the cart, as well as successfully processed digital shopping carts (e.g., carts that result in a completed transaction or purchase).

After determining the profile for the user/device, the online resource may determine priority and/or data processing and delivery speed for the data request by the device. A priority of the device may correspond to a position within a data processing/delivery queue for the device based on the user profile, which may be determined using the user profile. A data processing/delivery speed may correspond to server processing and data transfer resources provided for the particular data request, which may include how much processing resources are needed to process the data request, bandwidth provided to data transfers, or other throttling of data process/delivery used in order to perform load balancing by the online resource. The priority and/or data processing/delivery speed may be based on the lifetime or other time period value of the user/device to the online resource (referred herein generally as the "user/device value"). The user/device value may be based on the amount of server resources used by the user/device during previous use of the online resource for the benefit provided by the user/device when using the online resource.

Additionally, the user/device value may be based on electronic transaction processing success rates/ratios versus the amount of server resources provided to the user/device during an online shopping session. For example, if the use often browses items and/or adds the items to a digital shopping cart but rarely or has not previously checked out for the transaction and completed the transaction, the user may have a low priority compared to other devices as the data request is unlikely to lead to a converted transaction. Conversely, if the user has a high conversion rate and often completes transactions after browsing, the user may be a higher value and thus the priority and/or data processing/delivery speed may be increased in order to successful convert a transaction associated with the data request. The electronic transaction processing conversion ratio may be based on an amount for each transaction, number of completed/abandoned transactions, and/or amount of data processing and delivery used for each completed/abandoned transaction. For example, the conversion ratio may correspond to a function of transaction value over time, such as a median or average transaction value over time, number of visits, and/or computing resources consumed. More or less weight may be given to profile data based on the timeline, for example, by decreasing a weight of the profiles historical use of the online resource that are more distant in the profile's past and/or eliminating profile data after a certain past date or length of time.

The priority and/or data processing/delivery speed may also be specific to the particular online resource based on the value of the user/device to the particular online resource. However, the priority and/or data processing/delivery speed may also be based on other online resources generally or those online resources similar to the particular online resource receiving the data request. The other online resources may be weighed the same or receive a different weight in the determination of the priority and/or data processing/delivery speed, for example, by emphasizing the particular online resource based on the previous history of the user/device with that resource. With new online resources used by the user/device, the priority and/or data processing/delivery speed may be based on other online resources generally or may be based on use of similar online resources (e.g., similar merchants and/or merchant platforms).

After determining the priority and/or data processing/delivery speed, the online resource may determine the computing resources to provide to the data request, such as the server processing resources, data storage resources, and/or data transfer resources. This may include placing the data request in a particular position within a data queue used to process the data request with other data requests from other device, or changing the position of the data request within the queue (e.g., moving up or down in a processing order list). Additionally, data processing/delivery speeds may be adjusted by changing the amount of bandwidth, processing resources, computational power, and/or other server resource that is provided to the data request. The online resource may optimize the load balancing by adjusting the priority and/or data processing/delivery speed based on the user profile to provide additional resources to data requests that require additional server processing power and/or data transfer rates. Service level agreements (SLAs) may also be affected by determined priority for a data request—e.g., a first SLA may state that 99.9% of priority A requests are responded to within 800 milliseconds, but a second SLA may state that 95% of priority B requests are responded to with 1250 milliseconds. Thus, a data request may be handled under a particular SLA regime (e.g. placed in a particular request queue vs. a different request queue) based on its prioritization level.

In certain embodiments, the online resource may further perform load balancing by providing different data or navigating the device to a different website or online data. For example, for devices that require fast data delivery speeds, the online resource may reroute the device to a faster loading webpage that may have less webpage data that allows for faster loading (e.g., less webpage graphics so that the page requires less data transfer for display). Conversely, for idle devices or devices that do not require fast loading speeds, the online resource may provide general webpages or those that require additional data for display.

After processing the data request based on the provided data, the user may utilize the device to interact with the data. The user may perform actions with the online resource, for example, using the received data on the user's device to perform electronic transaction processing. The user/device profile may be updated based on the additional actions taken during the use session of the online resource, which may affect the user's value to the particular online resource. Additionally, the online resource may utilize the additional actions to adjust future data request processing and/or delivery speeds during the current use session of the resource by the user/device.

In this manner, data processing and load speeds by a server or other online resource may be optimized depending on cross-platform usage of online resources. This may allow servers to interact with user devices to provide data in a faster manner depending on the requirements of the particular user, device, and/or data request. Moreover, this may reduce computing and network strain occurring when multiple devices interact with an online resource at the same time or within a similar time period.

FIG. 1 is a block diagram of a networked system 100 suitable for implementing the processes described herein, according to an embodiment. As shown, system 100 may comprise or implement a plurality of devices, servers, and/or software components that operate to perform various methodologies in accordance with the described embodiments. Example devices and servers may include device, stand-alone, and enterprise-class servers, operating an OS such as a MICROSOFT® OS, a UNIX® OS, a LINUX® OS, or other suitable device and/or server based OS. It can be appreciated that the devices and/or servers illustrated in FIG. 1 may be deployed in other ways and that the operations performed and/or the services provided by such devices and/or servers may be combined or separated for a given embodiment and may be performed by a greater number or fewer number of devices and/or servers. One or more devices and/or servers may be operated and/or maintained by the same or different entities.

System 100 includes a communication device 110, a client server 120, and a transaction processor server 140 in communication over a network 150. A user (not shown) may utilize communication device 110 to utilize the various features available for communication device 110, which may include processes and/or applications that may be associated with client server 120, such as accessing and interacting with data available from client server 120. Client server 120 may determine a priority for processing and delivering data for a data request from communication device 110 using a profile associated with communication device 110. In certain embodiments, the profile may be based on information from transaction processor server 140 for an account. Client server 120 may process the data request based on the priority. Transaction processor server 140 may further be used for electronic transaction processing based on data provided to communication device 110 from client server 120. Thus, in general, client server 120 may provide services to one or more different end users of communication device 110 (e.g. displaying web pages, responding to data requests, helping initiate transactions, etc.)

Communication device 110, client server 120, and transaction processor server 140 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 150.

Communication device 110 may be implemented as a communication device that may utilize appropriate hardware and software configured for wired and/or wireless communication with client server 120 and/or transaction processor server 140. For example, in one embodiment, communication device 110 may be implemented as a personal computer (PC), telephonic device, a smart phone, laptop/tablet computer, wristwatch with appropriate computer hardware resources, eyeglasses with appropriate computer hardware (e.g. GOOGLE GLASS®), other type of wearable computing device, implantable communication devices, and/or other types of computing devices capable of transmitting and/or receiving data, such as an IPAD® from APPLE®. Although only one communication device is shown, a plurality of communication devices may function similarly.

Communication device 110 of FIG. 1 contains a browser application 112, other applications 114, a database 116, and a communication module 118. Browser application 112 and other applications 114 may correspond to executable processes, procedures, and/or applications with associated hardware. In other embodiments, communication device 110 may include additional or different modules having specialized hardware and/or software as required.

Browser application 112 may correspond to one or more processes to execute modules and associated devices of communication device 110 to access an online resource provided by client server 120, such as a website, online marketplace or platform, or data provided by client server 120 on another platform. Browser application 112 may be utilized by the user of communication device 110 to access the online resource and provide a data request to client server 120, which may correspond to a request for data processing and/or data delivery by client server 120. In various embodiments, browser application 112 may correspond to a general browser application configured to retrieve, present, and communicate information over the Internet (e.g., utilize resources on the Internet) or a private network. In other embodiments, browser application 112 may correspond to a dedicated application of client server 120 and/or transaction processor server 140, which may be configured to engage in online browsing of items, generation of a digital shopping cart, and/or purchase of items through input provided to browser application 112. Browser application 112 may be used to track past user actions, such as data requests with client server 120 and/or other online resources, amount of time spent with an online resource and/or resources used during the time spent, or other online activity with resources. Browser application 112 may further track electronic transaction processing success and abandonment with online resources and transaction information for completed and abandoned transactions. Such data may be tracked using application data for browser application 112, such as browser history information, HTTP cookies or other data, and/or user input and data processing. Using the data, browser application 112 may generate a user profile or transmit the information to client server 120 and/or transaction processor server 140 for storage and/or profile processing. Browser application 112 may also interface with one or more applications of other applications 114 in order to facilitate generation of a user profile, for example, based on resources used by other applications 114.

Browser application 112 may be implemented with a user interface enabling the user to process transactions electronically using an account with transaction processor server 140. Browser application 112 may be used to generate a transaction by adding items to a digital shopping cart and/or requesting electronic transaction processing. In certain embodiments, browser application 112 may also be used to abandon a digital shopping cart by deleting the items/cart from processing and/or leaving the cart unprocessed. A user may enter payment options, select and provide payment options on checkout/payment of one or more items with a merchant, and complete the transaction for the item(s) through processing a payment request for the item(s) with transaction processor server 140. Browser application 112 may also be used to establish a user account, such as a payment account, with transaction processor server 140 to provide payments through the payment account. Browser application 112 may be used to enter transaction data, including an amount, location, and/or merchant identifier. The payment request may be processed using a payment account for the user. For example and as discussed herein, transaction processor server 140 may be used to provide payment to the merchant associated with client server 120. Browser application 112 may therefore be used to provide payment information for use in processing the payment. Browser application 112 may be utilized to view the results of the transaction and/or for viewing and storage of a transaction history, such as a receipt.

In various embodiments, communication device 110 includes other applications 114 as may be desired in particular embodiments to provide features to communication device 110. For example, other applications 114 may include security applications for implementing client-side security features, programmatic client applications for interfacing with appropriate application programming interfaces (APIs) over network 150, or other types of applications. Other applications 114 may also include email, texting, voice and IM applications that allow a user to send and receive emails, calls, texts, and other notifications through network 150. Other applications 114 may include social networking applications, media viewing, and/or microblogging applications. In various embodiments, other applications 114 may include financial applications, such as banking applications. Other applications 114 may therefore include applications used with online resources that may be tracked to generate a user profile. Other applications 114 may include device interfaces and other display modules that may receive input from the user and/or output information to the user. For example, other applications 114 may contain software programs, executable by a processor, including a graphical user interface (GUI) configured to provide an interface to the user. Other applications 114 may therefore use devices of communication device 110, such as display devices capable of displaying information to users and other output devices.

Communication device 110 may further include database 116 stored in a transitory and/or non-transitory memory of communication device 110, which may store various applications and data and be utilized during execution of various modules of communication device 110. Database 116 may include, for example, identifiers such as operating system registry entries, cookies associated with browser application 112 and/or other applications 114, identifiers associated with hardware of communication device 110, or other appropriate identifiers, such as identifiers used for payment/user/device authentication or identification, which may be communicated as identifying communication device 110 to transaction processor server 140. Database 116 may include data associated with browser application 112 and/or other application 114 to generate a user profile, as well as the user profile.

Communication device 110 includes at least one communication module 118 adapted to communicate with client server 120 and/or transaction processor server 140. In various embodiments, communication module 118 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. Communication module 118 may communicate directly with nearby devices using short range communications, such as Bluetooth Low Energy, LTE Direct, WiFi, radio frequency, infrared, Bluetooth, and near field communications.

Client server 120 may be maintained, for example, by a merchant that provides sales and/or data processing and delivery to users through communication device 110 and/or transaction processor server 140, which may include sale of items through an online platform. In this regard, client server 120 may further provide resource optimization of server resources for data processing and delivery based on profiles. Client server 120 may further interface with transaction processor server 140 for transaction processing of the transactions. In other embodiments, other types of online resources may instead correspond to client server 120. Client server 120 may be implemented using any appropriate hardware and software configured for wired and/or wireless communication with communication device 110 and/or transaction processor server 140. For example, in one embodiment, client server 120 may be implemented as a single or networked personal computer (PC), a smart phone, laptop computer, wearable computing device, and/or other types of computing devices at a merchant location capable of transmitting and/or receiving data. Although only one server is shown, a plurality of servers may function similarly.

Client server 120 of FIG. 1 contains a client application 122, other applications 124, a database 126, and a network interface component 128. Resource optimization application 130, client application 122, and other applications 124 may correspond to processes, procedures, and/or applications executable by a hardware processor, for example, a software program. In other embodiments, client server 120 may include additional or different modules having specialized hardware and/or software as required.

Resource optimization application 130 may correspond to one or more processes to execute modules and associated specialized hardware of client server 120 that provides analysis of data requests and user profiles to determine a priority of the data request and/or data processing/delivery importance or speed, and optimize server resources based on the determined priority/requirements/speed. In this regard, client application 122 may first receive a data request, such as a request for data delivery or processing using client application 122. (Thus, client application 122 may provide various services to one or more end users of communication device 110.) In response to the data request or other action/interaction by communication device 110 with client server 120, resource optimization application 130 may determine a profile associated with communication device 110, which may be device-specific or specific to a user utilizing communication device 110 (e.g., based on a user account and/or tracked actions for the user). The user profile may include data for online actions by the user/communication device 110, which may include bandwidth consumed with online resources, computing power used (e.g. server computing power, for example), tasks requested, number or amount of data delivered, number of server database queries generated responsive to actions by the user, or other information. The profile may also include an amount of electronic transaction processing performed by the user/communication device 110, including amount, number, and/or ratio of completed/abandoned transactions.

After accessing the user profile, resource optimization application 130 may use the profile for determination of a priority for data processing/delivery and/or a data processing/delivery speed provided for the request or interaction from communication device 110. The priority may be based on value of the user/communication device 110 to client server 120, for example, based on the data requirements of communication device 110 and the success rate of completed transaction processing by communication device 110. The priority for data processing/delivery may then be utilized with the data request to process the request based on the priority of the request. For example, resource optimization application 130 may adjust a data queue for the data request based on the priority (e.g. moving a particular data request lower in a queue, or placing the particular data request in a different lower priority queue that is subject to a different service level agreement than a higher priority queue). In further embodiments, resource optimization application 130 may adjust, partition, and/or optimize server resources for client server 120 based on the priority, for example, by providing more or less bandwidth, computational power/availability, and/or processing load to the data request. Resource optimization application 130 may repeatedly, continuously, and/or intermittently update the priority based on new data for the user profile, such as completed transactions, device idling (e.g., not actively requiring data), and/or server resources used by communication device 110. Resource optimization application 130 may determine a new priority for additional data requests by communication device 110 based on the new data.

Client application 122 may correspond to one or more processes to execute modules and associated specialized hardware of client server 120 that provide sales, checkout, and payment processes for a transaction to purchase one or more items for sale from a user, such as a merchant or seller, corresponding to client server 120. In this regard, client application 122 may correspond to specialized hardware and/or software of client server 120 to provide a convenient interface to permit a seller to enter, view, and/or edit items and/or services for purchase by the buyer associated with communication device 110. For example, client application 122 may be implemented as an application having a user interface enabling the seller to enter item information and request payment for a transaction on checkout/payment of one or more items/services. In certain embodiments, client application 122 may correspond more generally to a web browser configured to provide information over the Internet, for example, by hosting a website or online marketplace corresponding to the merchant and/or communicating information to another online marketplace utilized by the merchant or seller. Thus, client application 122 may provide item sales through an online marketplace using the website of the merchant or another service provider. In this regard, client application 122 may correspond to and/or provide an online resource that is accessible by communication device 110 and optimized for data processing/delivery by resource optimization application 130.

The user associated with communication device 110 may initiate a transaction using client application 122, where transaction processing may occur through communications between communication device 110 and client server 120 using transaction processor server 140. Thus, item sales and/or transaction information may be communicated to communication device 110, where the user associated with communication device 110 may view and interact with the information, for example, to approve or decline transaction processing. In other embodiments, the user may provide data to client application 122 for the payment, such as a token for a payment account or a payment instrument. Once a payment amount is determined for a transaction for items to be purchased by the user associated with communication device 110, client application 122 may request payment from the user associated with communication device 110 for transaction processing. Client application 122 may then receive the results of the transaction processing, and complete the transaction with the user, for example, by providing the user and the other the items for the split transaction or declining the split transaction where the user is not authenticated or the split transaction is not authorized (e.g., insufficient funds, rejection of the transaction based on risk analysis, etc.). Client application 122 may receive a payment notification from transaction processor server 140, including the payment value. A transaction history or receipt may then be generated by client application 122 and provided to one or more of communication device 110 and/or transaction processor server 140.

Client server 120 includes other applications 124 as may be desired in particular embodiments to provide features to client server 120. For example, other applications 124 may include security applications for implementing client-side security features, programmatic client applications for interfacing with appropriate application programming interfaces (APIs) over network 150, or other types of applications. Other applications 124 may also include email, texting, voice and IM applications utilized by communication device 110 over network 150. In various embodiments, other applications 124 may include financial applications, such as banking, online payments, money transfer, or other applications utilized by communication device 110. Other applications 124 may contain software programs that may provide a graphical user interface (GUI) to communication device 110 for interaction with client server 120.

Client server 120 may further include database 126 which may include, for example, identifiers such as operating system registry entries, cookies associated with client application 122 and/or other applications 124, identifiers associated with hardware of client server 120, or other appropriate identifiers, such as identifiers used for payment/user/device authentication or identification. Identifiers in database 126 may be used by a payment/credit provider to associate client server 120 with a particular account maintained by the payment/credit provider. Database 126 may further include merchant and/or item data for the merchant platform or provided to another platform for processing, as well as transaction information for completed and abandoned transactions. Database 126 may further include user profiles and data used to determine user profiles for a plurality of users that utilize client server 120, which may include communication device 110. Database 126 may include identifiers associated with communication device 110 used for application, user, and/or device identification, including identifiers associated with browser application 112 and/or other applications 114. Additionally, received data requests, data queues, and/or device prioritizations may be stored to database 126.

Client server 120 includes at least one network interface component 128 adapted to communicate communication device 110 and/or client server 120 over network 150. In various embodiments, network interface component 128 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Transaction processor server 140 may be maintained, for example, by an online service provider, which may provide transaction processing services, as well as account services used to generate a user profile that may be used for load balancing of client server 120. In this regard, transaction processor server 140 includes one or more processing applications which may be configured to interact with communication device 110, client server 120, and/or another device/server to facilitate connecting users having a shared interest. In one example, transaction processor server 140 may be provided by PAYPAL®, Inc. of San Jose, Calif., USA. However, in other embodiments, transaction processor server 140 may be maintained by or include another type of service provider, which may provide the aforementioned services to a plurality of users.

Transaction processor server 140 of FIG. 1 includes a transaction processing application 142, other applications 144, a database 146, and a network interface component 148. Transaction processing application 142 and other applications 144 may correspond to executable processes, procedures, and/or applications with associated hardware. In other embodiments, transaction processor server 140 may include additional or different modules having specialized hardware and/or software as required.

Transaction processing application 142 may correspond to one or more processes to execute software modules and associated specialized hardware of transaction processor server 140 to receive a transaction processed by a user associated with communication device 110 and process the transaction. In this regard, transaction processing application 142 may correspond to specialized hardware and/or software to receive information for a transaction processed by a user. For example, transaction processing application 142 may receive, from communication device 110 and/or client server 120, data for a transaction between the user associated with communication device 110 and the merchant associated with client server 120. The data for the transaction may include transaction information, such as a cost of the split transaction, items in the transaction, tax, tip, and/or other transaction information.

Transaction processing application 142 may provide transaction processing services to users, for example though a payment account and/or payment instruments, which may include payment during transaction processing of the transaction. In this regard, transaction processing application 142 may provide payment services and payment accounts, including digital wallets storing payment instruments. The transaction processing services may allow for a payment by the user to the merchant through a payment instrument stored to the digital wallet, including a credit/debit card, banking account, payment account with transaction processor server 140, and/or other financial instrument (e.g., cryptocurrency or other digital value, other types of online payment accounts, credit lines, and/or other value establishing item). In order to establish a payment account for the digital wallet, transaction processing application 142 may receive information requesting establishment of the payment account. The information may include user personal and/or financial information. Additionally the information may include a login, account name, password, PIN, or other account creation information. The user may provide a name, address, social security number, or other personal information necessary to establish the account and/or effectuate payments through the account. Transaction processing application 142 may further allow the user to service and maintain the payment account, for example, by adding and removing payment instruments.

In order to perform transaction processing of the transaction and/or payments, transaction processing application 142 may debit an account of the user and provide the payment to an account of the merchant or other. Transaction processing application 142 may also be used to provide transaction histories for processed transactions. The data for the transaction and/or the account may be accessed by communication device 110 and/or client server 120 for use in generating a user profile associated with the account. For example, transaction processing application 142 may include data for completed and/or abandoned transactions using the account, as well as transaction value and data usage when generating the transaction (e.g., viewing items and/or adding to a digital shopping cart). Other types of resource usage may also be monitored and utilized when generating a user profile, such as central processing unit usage and resources, memory, and/or bandwidth. Transaction processing application 142 may further generate the user profile, in some embodiments, and provide the user profile to client server 120 for processing.

In various embodiments, transaction processor server 140 includes other applications 144 as may be desired in particular embodiments to provide features to transaction processor server 140. For example, other applications 144 may include security applications for implementing server-side security features, programmatic client applications for interfacing with appropriate application programming interfaces (APIs) over network 150, or other types of applications. Other applications 144 may contain software programs, executable by a processor, including a graphical user interface (GUI), configured to provide an interface to the user when accessing transaction processor server 140, where the user or other users may interact with the GUI to more easily view and communicate information. In various embodiments, other applications 144 may include connection and/or communication applications, which may be utilized to communicate information to over network 150.

Additionally, transaction processor server 140 includes database 146. As previously discussed, a user may establish one or more digital wallets and/or payment accounts with transaction processor server 140. Digital wallets and/or payment accounts in database 146 may include user information, such as name, address, birth date, payment instruments/funding sources, additional user financial information, user preferences, and/or other desired user data. Users may link to their respective digital wallets and/or payment accounts through an account, user, and/or device identifier. Thus, when an identifier is transmitted to transaction processor server 140, e.g., from communication device 110, one or more digital wallets and/or payment accounts belonging to the users may be found. Database 146 may also store account history information and user profile information.

In various embodiments, transaction processor server 140 includes at least one network interface component 148 adapted to communicate with communication device 110 and/or client server 120 over network 150. In various embodiments, network interface component 148 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 150 may be implemented as a single network or a combination of multiple networks. For example, in various embodiments, network 150 may include the Internet or one or more intranets, landline networks, wireless networks, and/or other appropriate types of networks. Thus, network 150 may correspond to small scale communication networks, such as a private or local area network, or a larger scale network, such as a wide area network or the Internet, accessible by the various components of system 100.

Figure 2A:
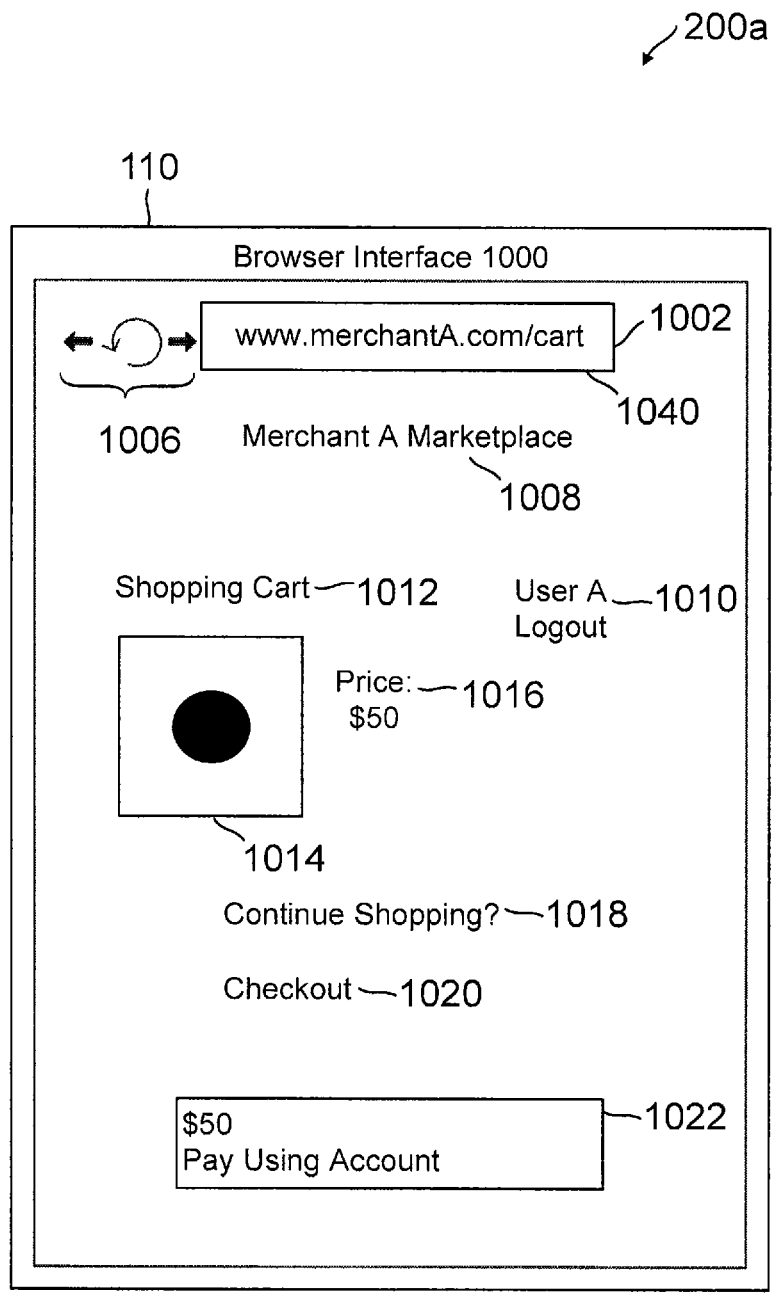
FIG. 2A is a user interface of a device displaying data received from a server based on a user profile associated with the device, according to an embodiment.

FIG. 2A is a user interface of a device displaying data received from a server based on a user profile associated with the device, according to an embodiment. Environment 200a includes a communication device 110 corresponding generally to the described features, processes, and components of communication device 110 in system 100 of FIG. 1.

Environment 200a includes interface data displayed after accessing an online resource and requesting data processing and delivery from the online resource. Thus, one or more elements within a browser interface 1000 on communication device 110 may be processed and delivered based on a data processing and delivery priority and/or speed depending on a user profile associated with communication device 110. Moreover, browser interface 1000 may correspond to a digital shopping cart 1012 that may be used to determine and/or update a user profile to determine the priority/speed of data processing/delivery based on the conversion of digital shopping cart 1012.

For example, communication device 110 may be used to access a merchant A marketplace 1008 using a navigation address 1004 input to an address field 1002 and navigate on merchant A marketplace 1008 using address field 1002 with navigation tools 1006 and user input. While on merchant A marketplace 1008, a user A account 1010 may be logged in to merchant A marketplace 1008 to perform browsing, digital shopping cart 1012 generation, and electronic transaction processing and checkout. Digital shopping cart 1012 may be generated for an item 1014 having a price 1016. Digital shopping cart 1012 may be processed using checkout 1020 through payment option 1022 for user A account 1010. Payment option 1022 may also provide a payment using an account with a service provider and/or merchant A marketplace 1008, or may be processed using other forms of value, including cryptocurrency, gift cards, credit cards, or other digital or real value. Moreover, processing of digital shopping cart 1012 may be paused and/or abandoned through a browsing option 1018.

Generation of digital shopping cart 1012 may be performed based on the user profile for user A account 1010. For example, data processing and delivery times may be reduced or increased to perform load balancing of processing and data transmission resources for merchant A marketplace 1008. This may be based on a value of user A account 1010 to merchant A marketplace 1008, which may be determined through past processed and/or abandoned transactions by user A account 1010 on merchant A marketplace 1008. Moreover, in response to either abandoning or completing digital shopping cart 1012, the user profile may be updated and future data requests may be determined based on the conversion or abandonment of digital shopping cart 1012.

Figure 2B:
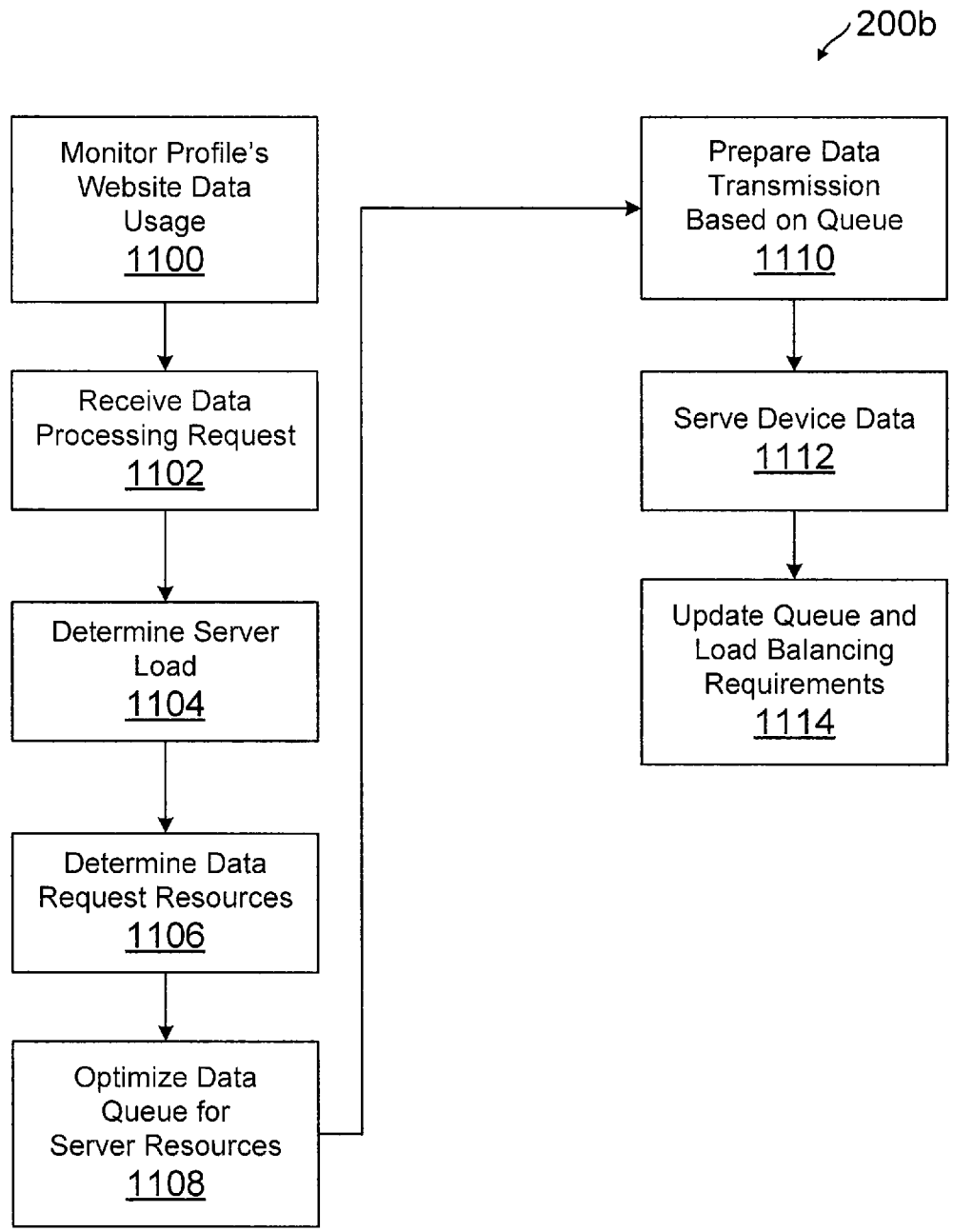
FIG. 2B is a flowchart executed by a server or other online resource for optimizing data delivery during multiple device requests, according to an embodiment.

FIG. 2B is a flowchart 200b executed by a server or other online resource for optimizing data delivery during multiple device requests, according to an embodiment. Note that one or more steps, processes, and methods described herein with regard to flowchart 200b may be omitted, performed in a different sequence, or combined as desired or appropriate.

Flowchart 200b initiates at step 1100 where an online resource, such as a server providing a website or more generally any data over a network, may monitor a profile's website data usage, which may include electronic transaction processing results (e.g., digital shopping cart completions and abandonments). This may be monitored by the specific online resource and/or may be tracked across multiple online resources, where different weights may be applied to data from other resources. At step 1102, a data processing request is received by the online resource, which may correspond to a request to process some input provided by a device and delivery data to the device. The request may utilize server resources. Thus, at step 1104, the server may determine a current processing load, which may require optimization for load balancing of the server.

After determining the server load, resources utilized for the data request are determined. The resources may correspond to server data transmission and/or processing availability. The resources utilized by the data request further correspond to those data transmission and processing resources that are required for the specific data request, such as computational requirements and bandwidth usage. Using the profile monitored at step 1100, a data queue for the server is optimized based on the server resources, at step 1108. Optimization of the data queue may determine an order or priority for use of the resources to process the data request, which may affect the data request processing speed based on other data requests being handled by the server. A data transmission is prepared based on the queue, at step 1110, which may then be served to the device associated with the profile at step 1112. Thus, the data requests processing speed may be adjusted to optimize load balancing for the server. Moreover, at step 1114, the data queue and load balancing requirements are updated based on processing the data request.

Figure 3:
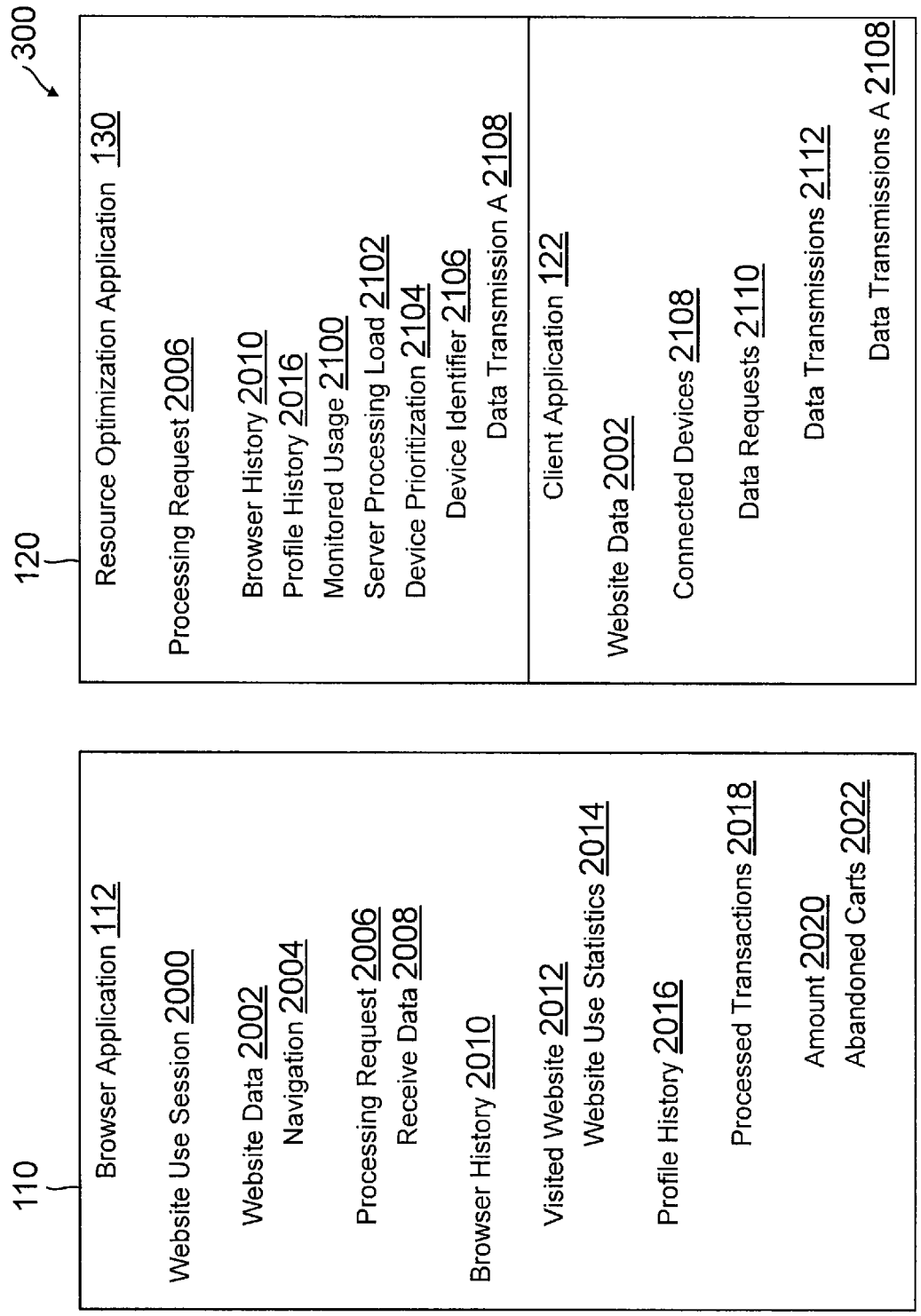
FIG. 3 is a system environment having a communication device that receives data from a client server based on an optimized data queue to reduce server data load times, according to an embodiment.

FIG. 3 is a system environment having a communication device that receives data from a client server based on an optimized data queue to reduce server data load times, according to an embodiment. Environment 300 of FIG. 3 includes communication device 110 and client server 120 as discussed in reference to system 100 of FIG. 1. In this regard, communication device 110 executes browser application 112, while client server 120 executes client application 122 and resource optimization application 130, all having the processes and features discussed in reference to system 100 of FIG. 1.

Browser application 112 includes a website use session 2000 having website data 2002 received during website use session 2000 based on navigation 2004 executed by browser application 112. Moreover, during website use session 2000, processing request 2006 may be input and transmitted to client server 120. Resource optimization application 130 may then be used to optimize use of server resources available to client server 120. For example, browser history 2010 for browser application 112 may be transmitted to resource optimization application 130, which may include at least a visited website 2012 and website use statistics, such as data processing historical requirements and lifetime value to visited website 2012 based on the historical requirements for communication device 110. Browser application 112 may also provide a profile history 2016 having processed transactions 2018 that may correspond to electronic transaction processing success rates with websites based on an amount of data used by communication device 110. Processed transactions 2018 may track an amount 2020 and data associated with abandoned carts 2022.

Resource optimization may utilize this browser history 2010 and profile history 2016 with monitored usage 2100 for communication device 110 and server processing load 2102. Device prioritization 2104 may then be determined for communication device 110, which may be associated with a device identifier 2106 for communication device 110 for data transmissions A 2108. Client application 122 may be used to provide website data 2002 for browser application 112 during website use session 2000. Website data 2002 includes connected devices 2108 that provide data requests 2110. In response to data requests 2110, data transmissions 2112 may be optimized based on data processed by resource optimization application 130, including data transmission A 2108.

Figure 4:
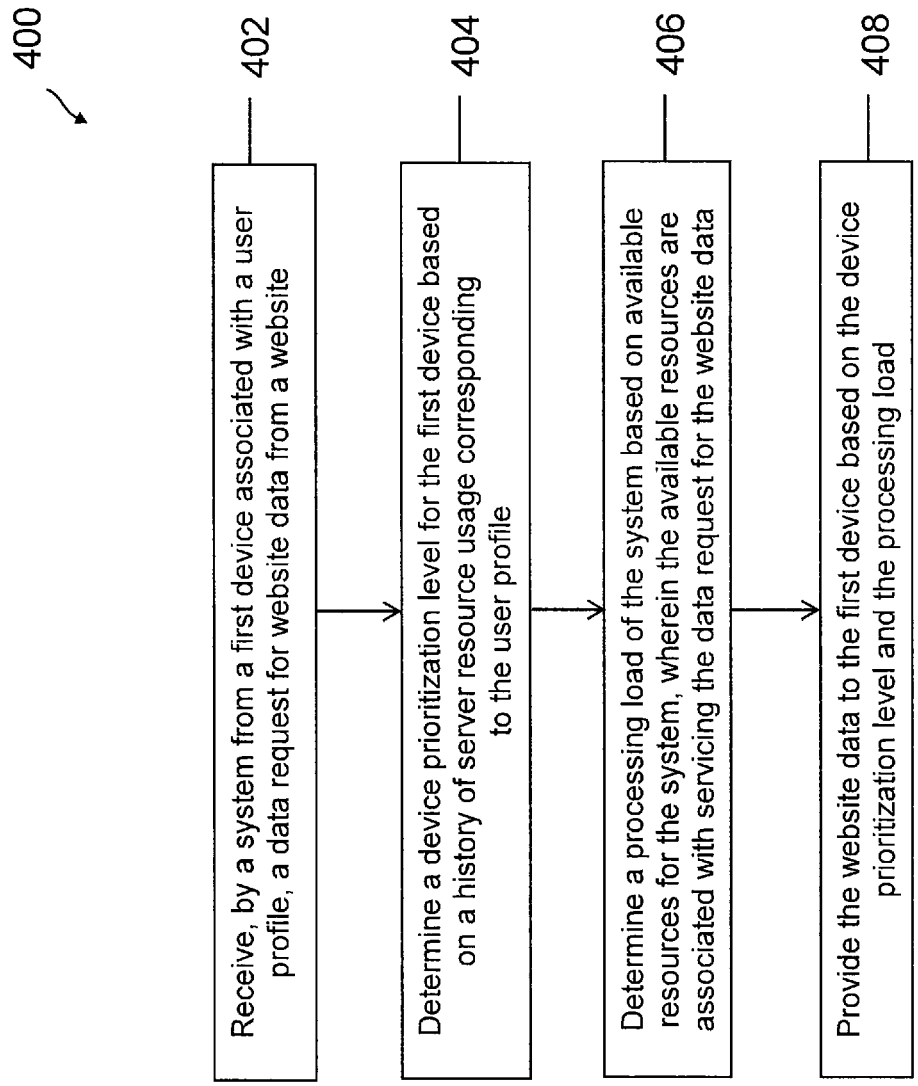
FIG. 4 is a flowchart of a process for optimization of data queue priority for reducing network data load speeds, according to an embodiment.

FIG. 4 is a flowchart of a process for optimization of data queue priority for reducing network data load speeds, according to an embodiment. Note that one or more steps, processes, and methods described herein with regard to flowchart 400 may be omitted, performed in a different sequence, or combined as desired or appropriate.

At step 402 of flowchart 400, a data request for website data from a website is received by a system from a device (e.g., communication device 110) associated with a user profile. For example, client server 120 may receive the data request, or another processing device or server may receive the data request (e.g., transaction processor server 140 where transaction processor server may provide remote resource optimization services for client server 120). The user profile may include tracked data across a plurality of websites and/or online resources, such as a transaction history of transactions conducted by a user for the device with the website and/or the other websites and online resources. For example, the user profile may be monitored across a plurality of websites, or the user profile may be website specific for only that website. In some embodiments, both may be combined and weighted differently, such as favoring the website but including additional information from other websites. The profile may also include a browsing time and/or amount of data processing/delivery previously used by the device. The website data may correspond to an online purchasing platform hosted by the website.

At step 404 of flowchart 400, a device prioritization level for the device is determined, by client server 120, based on a history of server resource usage corresponding to the user profile. Transaction processor server 140 may also provide the determination of the prioritization level for communication device 110, as previously discussed. When determining the device prioritization level, a queue order may be accessed for a data queue, and the prioritization may be based on the queue order and the device's position in the queue order. Additionally, the device prioritization level may be based on at least one of a time spent on the website by the device, a transaction completion rate for electronic transaction processing on the website, a number of logins associated with the user profile on the website, a past amount of bandwidth used by the device, or a past amount of data requested by the device during each past website use session by the device. This also may include a ratio or success rate of successfully completed transactions to uncompleted or abandoned transactions in the user profile, such as a digital shopping cart checkout or abandonment rate with an online resource.

At step 406 of flowchart 400, a processing load of the system is determined based on available resources for the system, wherein the available resources are associated with servicing the data request for the website data. The processing load may be determined for client server 120 by the corresponding resource optimization device/server (e.g., client server 120 or transaction processor server 140). When determining the processing load, data requests received by the system within a predetermined time period may be determined. This may indicate the current server processing requirements and processing/data transmission load of the system. The device prioritization level may be based on load balancing of the current service processing requirements.

At step 408 of flowchart 400, the website data is provided to the device, such as communication device 110, based on the device prioritization level and the processing load. Client server 120 may provide the website data to communication device 110 based on the prioritization and processing load over network 150. This may include providing the website data based on the queue order. In other embodiments, the website data may be provided at a reduced data transmission speed to reduce bandwidth consumption and perform load balance, or may be increased where bandwidth is available. Additionally, the website data may be transmitted by adjusting a server resource, such as changing a processing order, adjusting the bandwidth, reducing or increasing webpage load time, or throttling data transmission speeds based on load balancing. Moreover, for certain devices, a webpage with a reduced amount of webpage data may instead be transmitted to the device based on the user profile, such as if the user's transaction completion ratio exceeds a threshold. After processing and/or delivering the data, the device prioritization level may also be updated based on processed transactions and other online events of the device.

Figure 5:
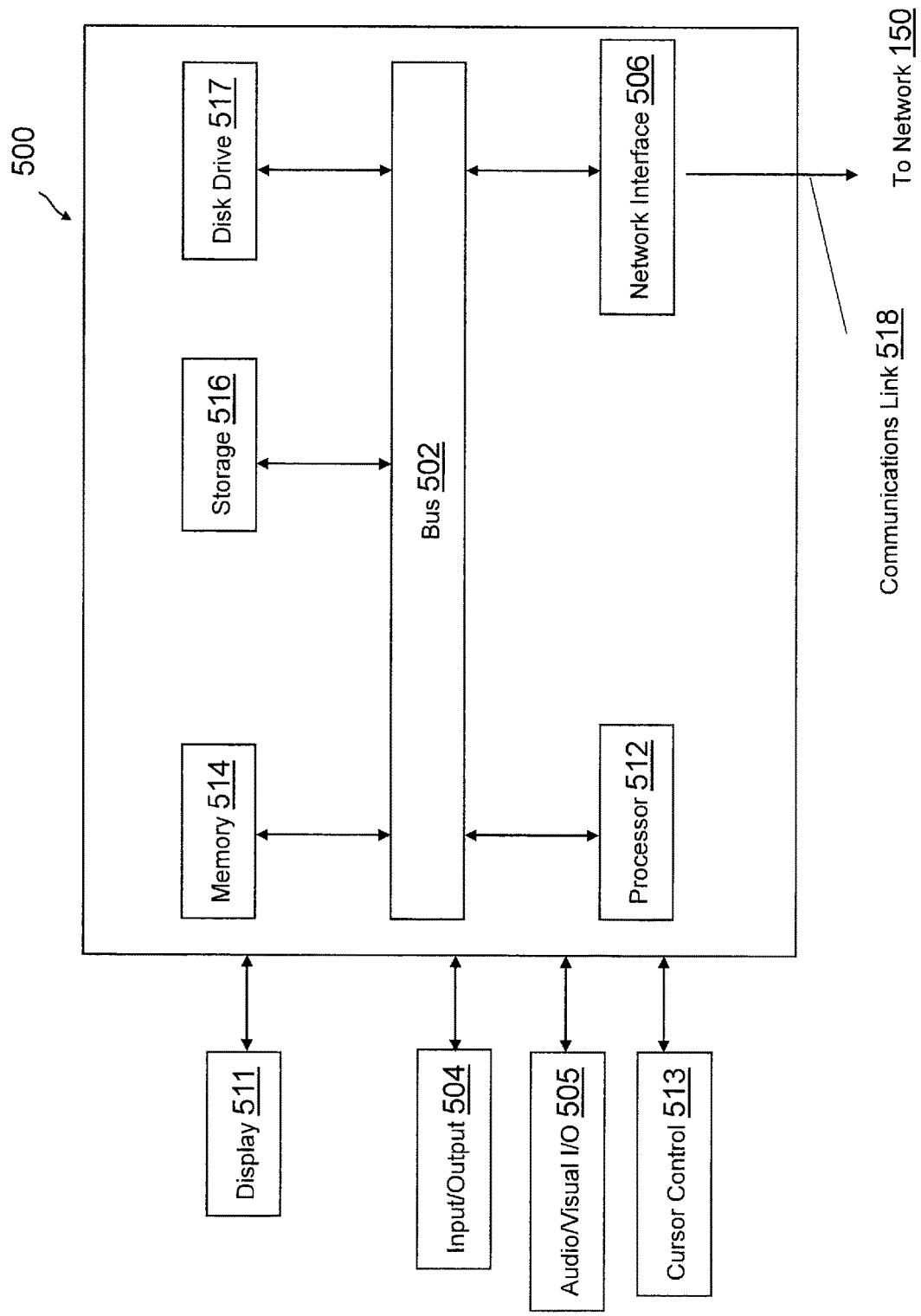
FIG. 5 is a block diagram of a computer system suitable for implementing one or more components in FIG. 1, according to an embodiment.

FIG. 5 is a block diagram of a computer system suitable for implementing one or more components in FIG. 1, according to an embodiment. In various embodiments, the communication device may comprise a personal computing device (e.g., smart phone, a computing tablet, a personal computer, laptop, a wearable computing device such as glasses or a watch, Bluetooth device, key FOB, badge, etc.) capable of communicating with the network. The service provider may utilize a network computing device (e.g., a network server) capable of communicating with the network. It should be appreciated that each of the devices utilized by users and service providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons, image, or links, and/or moving one or more images, etc., and sends a corresponding signal to bus 502. I/O component 504 may also include an output component, such as a display 511 and a cursor control 513 (such as a keyboard, keypad, mouse, etc.). An optional audio input/output component 505 may also be included to allow a user to use voice for inputting information by converting audio signals. Audio I/O component 505 may allow the user to hear audio. A transceiver or network interface 506 transmits and receives signals between computer system 500 and other devices, such as another communication device, service device, or a service provider server via network 150. In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s)

512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A server system comprising:
   a processor; and
   a non-transitory computer-readable medium having stored thereon instructions executable to cause the server system to perform operations comprising:
   receiving, from a user device of a particular user, a data request for data from the server system;
   retrieving user profile data associated with the server system based on a user identifier for the particular user included in the data request, wherein the user profile data comprises a history of server resource usage of a plurality of online systems including the server system;
   determining a digital usage history of the server system by the particular user over a period of time;
   determining a device prioritization level for a data processing of the data request from the user device of the particular user based on the digital usage history of the server system;
   determining a processing load of the server system based on one or more processing resources for the server system, wherein the one or more processing resources are associated with servicing the data request;
   determining a data queue of a plurality of data queues that are available for processing the data request from the user device, wherein the determining the data queue is based on the device prioritization level, the processing load, and service level agreements (SLAs) for the plurality of data queues that designate available data queues for the user device, and wherein the data queue is configured to queue requests for a plurality of user devices;
   determining a position for the data processing of the data request from user device based on the device prioritization level and relative to a plurality of other data processing requests from with the plurality of user devices within the data queue; and
   providing, from the server system to the user device, a response to the data request based on the device prioritization level, the processing load, and the position.

2. The server system of claim 1, wherein the operations further comprise:
   receiving, from a second user device of a different user, a second data request for at least one of the data or additional data, wherein the second data request is received at a later time than the data request;
   determining, using a second user identifier included in the second data request for the different user, a second device prioritization level for the second user device of the different user based on a history of server usage of the server system for the different user; and
   providing a response to the second data request to the second user device before providing the response to the data request to the user device, based on the second device prioritization level being greater than the device prioritization level.

3. The server system of claim 1, wherein the operations further comprise:
limiting a bandwidth speed at which the response to the data request is provided to the user device based on the device prioritization level.

4. The server system of claim 1, wherein the server system includes a computer system that performs the operations.

5. The server system of claim 1, wherein the data request is a request to make an electronic purchase transaction.

6. The server system of claim 1, wherein determining the device prioritization level is based on a quantity of successfully completed transactions and a second quantity of uncompleted transactions by one or more devices associated with the user profile data.

7. The server system of claim 1, wherein the determining the device prioritization level is based on at least one of a time spent on a website by the user device, a transaction completion rate for electronic transaction processing on the website, a number of logins associated with the user profile data on the website, a past amount of bandwidth used by the user device, or a past amount of data requested by the user device during past website use by the user device.

8. A method, comprising:
receiving, at a server system from a user device of a particular user, a data request for data from the server system;
retrieving user profile data associated with the server system based on a user identifier for the particular user included in the data request, wherein the user profile data comprises a history of server resource usage of a plurality of online systems including the server system;
determining a digital usage history of the server system by the particular user over a period of time;
determining a device prioritization level for a data processing of the data request from the user device of the particular user based on the digital usage history of the server system;
determining a processing load of the server system based on one or more processing resources for the server system, wherein the one or more processing resources are associated with servicing the data request;
determining a data queue of a plurality of data queues that are available for processing the data request from the user device, wherein the determining the data queue is based on the device prioritization level, the processing load, and service level agreements (SLAs) for the plurality of data queues that designate available data queues for the user device, and wherein the data queue is configured to queue requests for a plurality of user devices;
determining a position for the data processing of the data request from the user device based on the device prioritization level and relative to a plurality of other data processing requests from the plurality of user devices within the data queue; and
providing, from the server system to the user device, a response to the data request based on the device prioritization level, the processing load, and the position.

9. The method of claim 8, wherein the device prioritization level for the user device of the particular user is based on load balancing requirements of the server system.

10. The method of claim 8, wherein the server system comprises a plurality of servers hosting an online platform associated with a processing of the data, and wherein the providing the response comprises:
requesting the processing of the data from at least one of the plurality of servers for the online platform;
receiving, from the at least one of the plurality of servers, a result of the processing of the data on the online platform; and
returning the result to the user device.

11. The method of claim 8, wherein the user profile data comprises a transaction history of transactions conducted by the particular user through at least one of the server system or a dedicated application associated with the server system, and wherein the device prioritization level is based on the transaction history.

12. The method of claim 8, wherein the server system comprises a plurality of computing devices linked via one or more computer networks.

13. The method of claim 8, further comprising:
receiving, from a second user device of a different user, a second data request for at least one of the data or additional data, wherein the second data request is received at a later time than the data request;
determining, using a second user identifier included in the second data request for the different user, a second device prioritization level for the second user device of the different user based on a history of server usage of the server system for the different user; and
providing a response to the second data request to the second user device before providing the response to the data request to the user device, based on the second device prioritization level being greater than the device prioritization level.

14. The method of claim 8, wherein at least a portion of the response to the data request corresponds to purchasing data originating from an online purchasing platform hosted by the server system.

15. A non-transitory computer-readable medium having stored thereon instructions that are executable by a server system to cause the server system to perform operations comprising:
receiving, from a user device of a particular user, a data request for data from the server system;
retrieving user profile data associated with the server system based on a user identifier for the particular user included in the data request, wherein the user profile data comprises a history of server resource usage of a plurality of online systems including the server system;
determining a digital usage history of the server system by the particular user over a period of time based on the history of server resource usage of the plurality of online systems;
determining a device prioritization level for a data processing of the data request from the user device of the particular user based on the digital usage history of the server system;
determining a processing load of the server system based on one or more processing resources for the server system, wherein the one or more processing resources are associated with servicing the data request;
determining a data queue of a plurality of data queues that are available for processing the data request from the user device, wherein the determining the data queue is based on the device prioritization level, the processing load, and service level agreements (SLAs) for the plurality of data queues that designate available data queues for the user device, and wherein the data queue is configured to queue requests for a plurality of user devices;
determining a position for the data processing of the data request from the user device based on the device prioritization level and relative to a plurality of other data processing requests from the plurality of user devices within the data queue; and
providing, from the server system to the user device, a response to the data request based on the device prioritization level and the processing load.

16. The non-transitory computer-readable medium of claim 15, wherein the operations further comprise:
receiving, from a second user device of a different user, a second data request for at least one of the data or additional data, wherein the second data request is received at a later time than the data request;
determining, using a second user identifier included in the second data request for the different user, a second device prioritization level for the second user device of the different user based on a history of server usage of the server system for the different user; and
providing a response to the second data request to the second user device before providing the response to the data request to the user device, based on the second device prioritization level being greater than the device prioritization level.

17. The non-transitory computer-readable medium of claim 15, wherein the determining the device prioritization level is based on at least one of a time spent on a website by the user device, a transaction completion rate for electronic transaction processing on the website, a number of logins associated with the user profile data on the website, a past amount of bandwidth used by the user device, or a past amount of data requested by the user device during past website use by the user device.

18. The non-transitory computer-readable medium of claim 15, wherein the operations further comprise:
limiting a bandwidth speed at which the response to the data request is provided to the user device based on the device prioritization level.

19. The non-transitory computer-readable medium of claim 15, wherein the data request is a request to make an electronic purchase transaction, and wherein the device prioritization level is based on a selected item within the electronic purchase transaction.

20. The non-transitory computer-readable medium of claim 15, wherein determining the device prioritization level is based on a quantity of successfully completed transactions and a second quantity of uncompleted transactions by one or more devices associated with the user profile data.

* * * * *

UNITED STATES PATENT AND TRADEMARK OFFICE
CERTIFICATE OF CORRECTION

PATENT NO. : 11,783,393 B2
APPLICATION NO. : 17/490402
DATED : October 10, 2023
INVENTOR(S) : Vidit Nayankumar Maniyar It is certified that error appears in the above-identified patent and that said Letters Patent is hereby corrected as shown below:

In the Claims

Claim 1, Column 20, Line 47, change "request from user device" to --request from the user device--.

Claim 1, Column 20, Line 49, change "requests from with the plurality" to --requests from the plurality--.

Signed and Sealed this
Twenty-eighth Day of November, 2023

*Katherine Kelly Vidal*
Katherine Kelly Vidal
*Director of the United States Patent and Trademark Office*